(12) United States Patent
Greenwood et al.

(10) Patent No.: US 6,384,291 B2
(45) Date of Patent: May 7, 2002

(54) OLIGOMERIZATION CATALYST SYSTEM AND METHOD OF MAKING AND METHOD OF USING SUCH CATALYST SYSTEM IN THE OLIGOMERIZATION OF OLEFINS

(75) Inventors: G. J. Greenwood; Bruce B. Randolph, both of Bartlesville, OK (US)

(73) Assignee: Phillips Petroleum Company, Bartlesville, OK (US)

(*) Notice: Subject to any disclaimer, the term of this patent is extended or adjusted under 35 U.S.C. 154(b) by 0 days.

(21) Appl. No.: 09/798,475

(22) Filed: Mar. 2, 2001

Related U.S. Application Data

(62) Division of application No. 09/210,039, filed on Dec. 11, 1998, now Pat. No. 6,228,797.

(51) Int. Cl.$^7$ ............................. C07C 2/08; C07C 2/16
(52) U.S. Cl. ...................... 585/526; 585/500; 585/510; 585/515; 585/520
(58) Field of Search ................................ 585/500, 510, 585/515, 520, 526

(56) References Cited

U.S. PATENT DOCUMENTS

| | | | |
|---|---|---|---|
| 4,599,476 A | 7/1986 | Drent | 585/511 |
| 4,613,723 A | 9/1986 | Olah | 585/730 |
| 4,791,081 A | 12/1988 | Childress et al. | 502/62 |
| 4,861,923 A | 8/1989 | Olah | 568/899 |
| 5,097,087 A | 3/1992 | Sanderson et al. | 585/255 |
| 5,220,095 A | 6/1993 | Hommeltoft et al. | 585/720 |
| 5,245,100 A | 9/1993 | Hommeltoft et al. | 585/720 |
| 5,276,239 A | 1/1994 | Sanderson et al. | 585/511 |
| 5,650,548 A | 7/1997 | Theriot et al. | 585/525 |
| 5,959,169 A | 9/1999 | Hommeltoft et al. | 585/458 |

FOREIGN PATENT DOCUMENTS

| | | | |
|---|---|---|---|
| EP | 0663377 A | 7/1995 | C07C/2/62 |
| WO | WO 95/19222 | 7/1995 | B01J/31/10 |

OTHER PUBLICATIONS

PCT Application WO 9711081A, Richard Beckerbauer et al. published Mar. 27, 1997; International Patent Classification C07F 7/18.

Harmer Mark et al.; "Towards the Sulfuric Acid of Solids", advanced materials, DE, VCH, Verlagsgesellschaft, Weinheim, vol. 10, No. 15, Oct. 20, 1998, pp. 1255–1257.

*Primary Examiner*—Elizabeth D. Wood
(74) *Attorney, Agent, or Firm*—Jeffrey R. Anderson

(57) ABSTRACT

A method of preparing a catalyst system which comprises mixing a first solid material comprising at least one perfluoroalkylsulfonic acid salt with a second solid material comprising at least one silanol comprising hydroxy groups and silicon to form a gel comprising silica and the at least one perfluororalkylsulfonic acid salt, and contacting the gel with an acidic solution to convert at least a portion of the at least one perfluoroalkylsulfonic acid salt to at least one perfluoroalkylsulfonic acid is disclosed.

Alternatively, a method of preparing a catalyst system which comprises mixing at least one perfluoroalkylsulfonic acid salt with silica gel to form a gel comprising silica and at least one perfluoroalkylsulfonic acid salt, and contacting the gel with an acidic solution to convert at least a portion of the at least one perfluororalkylsulfonic acid salt to at least one perfluororalkylsulfonic acid is disclosed.

The thus-obtained catalyst systems are employed as catalysts in the oligomerization of a hydrocarbon feedstock comprising unsaturated hydrocarbons.

15 Claims, No Drawings

OLIGOMERIZATION CATALYST SYSTEM AND METHOD OF MAKING AND METHOD OF USING SUCH CATALYST SYSTEM IN THE OLIGOMERIZATION OF OLEFINS

This application is a division of application Ser. No. 09/210,039, filed Dec. 11, 1998, now U.S. Pat. No. 6,228,797 on May 8, 2001.

BACKGROUND OF THE INVENTION

The present invention relates to catalyst systems useful in hydrocarbon upgrading processes and to methods for their production and use.

In another aspect, this invention relates to catalyst systems and processes for oligomerizing hydrocarbons employing the novel catalyst systems of this invention.

Perfluoroalkylsulfonic acids are useful for oligomerization of olefins having in the range of from 3 to 8 carbon atoms per molecule to diesel fuel range hydrocarbons having in the range of from 8 to 24 carbon atoms per molecule. However, many of these compounds are waxy, low surface area solids. The perfluoroalkyl groups of the perfluroalkylsulfonic acids tend to inhibit the dissolution of hydrocarbons into the perfluoroalkylsulfonic acids, and mass transfer limitations occur resulting in low catalyst activity.

Therefore, it is desirable to develop catalyst systems comprising perfluoroalkylsulfonic acid wherein the perfluoroalkylsulfonic acid is supported on a high-surface-area support so as to significantly increase the activity of the perfluoroalkylsulfonic acid in oligomerizing at least one olefin to diesel fuel range hydrocarbons.

SUMMARY OF THE INVENTION

It is an object of this invention to provide a novel catalyst system which is useful for at least partially oligomerizing at least one olefin to diesel fuel range hydrocarbons.

A further object of this invention is to provide a method of preparing a novel catalyst system effective for at least partially oligomerizing at least one olefin to diesel fuel range hydrocarbons.

It is a further object of this invention to employ this novel catalyst system as a catalyst in the at least partial oligomerization of at least one olefin to diesel fuel range hydrocarbons.

It is still a further object of the present invention to increase the efficiency of the oligomerization of at least one olefin to diesel fuel range hydrocarbons.

Yet another object of the present invention is to provide an improved oligomerization process of increased efficiency.

According to a first embodiment of the present invention, a method which can be used for producing a catalyst system is provided. The method comprises the steps of:

dissolving at least a portion of at least one perfluoroalkylsulfonic acid salt of the formula $C_nF_{2n+1}SO_3X$ in a basic solution comprising a base to thereby form a first liquid material, wherein n ranges from 2 to 20 and X is an element selected from the group consisting of sodium and potassium;

dissolving at least a portion of at least one hydrolyzable silane compound in a first acidic solution comprising a first acid to thereby form a second liquid material comprising at least one silanol comprising hydroxy groups and silicon;

mixing the first liquid material and the second liquid material to thereby form a gel comprising silica and the at least one perfluoroalkylsulfonic acid salt;

contacting the gel with a second acidic solution comprising a second acid to thereby form an acid-treated gel and to thereby convert at least a portion of the at least one perfluoroalkylsulfonic acid salt to at least one perfluoroalkylsulfonic acid of the formula $C_nF_{2n+1}SO_3H$ and to thereby convert at least a portion of the second acid to an acid salt;

removing at least a portion of the acid salt from the acid-treated gel to thereby form a purified gel; and drying the purified gel to thereby form the catalyst system.

According to a second embodiment of the present invention, an alternative method which can be used for producing a catalyst system is provided. The method comprises the steps of:

mixing at least one perfluoroalkylsulfonic acid salt of the formula $C_nF_{2n+1}SO_3X$ with silica gel and water to thereby form a gel comprising silica and at least one perfluoroalkylsulfonic acid salt, wherein n ranges from 2 to 20 and X is an element selected from the group consisting of sodium and potassium;

contacting the gel with an acidic solution comprising an acid to thereby form an acid-treated gel and to thereby convert at least a portion of the at least one perfluoroalkylsulfonic acid salt to at least one perfluoroalkylsulfonic acid of the formula $C_nF_{2n+1}SO_3H$ and to thereby convert at least a portion of the acid to an acid salt;

removing at least a portion of the acid salt from the acid-treated gel to form a purified gel; and drying the purified gel to thereby form the catalyst system.

According to a third embodiment of the present invention, a process is provided for oligomerizing at least a portion of a hydrocarbon feedstock comprising at least one olefin having in the range of from 3 to 8 carbon atoms per molecule. The process comprises contacting the hydrocarbon feedstock with a catalyst system prepared by the method of the first embodiment or, alternatively, the method of the second embodiment.

Other objects and advantages will become apparent from the detailed description and the appended claims.

DETAILED DESCRIPTION OF THE INVENTION

According to the first embodiment of the present invention, the catalyst system can be prepared by the following method.

At least a portion of at least one perfluoroalkylsulfonic acid of the formula $C_nF_{2n+1}SO_3H$, wherein n ranges from 2 to 20, can be converted to at least one perfluoroalkylsulfonic acid salt of the formula $C_nF_{2n+1}SO_3X$, wherein X comprises an element selected from the group consisting of sodium and potassium, by contacting the perfluoroalkylsulfonic acid with a first basic solution comprising water and a compound of the formula XOH. The at least one perfluoroalkylsulfonic acid can be contacted in any suitable manner known to effect the contact of the at least one perfluoroalkylsulfonic acid with the compound. It is preferred for the at least one perfluoroalkylsulfonic acid to be dissolved in an aqueous solution comprising XOH to thereby form the at least one perfluoroalkylsulfonic acid salt.

Alternatively, at least a portion of at least one perfluoroalkylsulfonyl halide of the formula $C_nF_{2n+1}SO_2Y$, wherein n ranges from 2 to 20 and Y is a halide selected from the group consisting of chlorine, fluorine, bromine, iodine, astatine and mixtures of any two or more thereof, preferably fluorine and chlorine, can be converted to at least one perfluoroalkylsulfonic acid salt of the formula $C_nF_{2n+1}SO_3X$, wherein X comprises an element selected from the group consisting of sodium and potassium, by contacting the perfluoroalkylsulfonyl halide with a first basic solution comprising water and a compound of the formula XOH. The at least one perfluoroalkylsulfonyl halide can be contacted in any suitable manner known to effect the contact of the at least one perfluoroalkylsulfonyl halide with the compound. It is preferred for the at least one perfluoroalkylsulfonyl halide to be dissolved in an aqueous solution comprising XOH to thereby form the at least one perfluoroalkylsulfonic acid salt.

Perfluoroalkylsulfonic acids are not easily purified. Thus, producing a sufficient quantity of purified perfluoroalkylsulfonic acid using typical separation techniques, such as distillation, to produce an effective oligomerization catalyst is extremely expensive and inefficient. However, the perfluoroalkylsulfonic acid salt (as produced above) of the perfluoroalkylsulfonic acid can be easily separated from the aqueous solution, by washing, settling and filtration techniques, resulting in a purified perfluoroalkylsulfonic acid salt.

The purified at least one perfluoroalkylsulfonic acid salt can be dissolved in a basic solution comprising a base comprising hydroxy groups to form a first liquid material.

At least one hydrolyzable silane compound can be dissolved in a first acidic solution comprising a first acid and water to thereby form a second liquid material comprising at least one silanol comprising hydroxy groups and silicon.

Suitable hydrolyzable silane compounds include, but are not limited to, alkoxysilane compounds, preferably, tetramethoxysilane and tetraethoxysilane.

Any suitable acid effective in hydrolyzing the hydrolyzable silane compound can be used as the first acid. Preferably, the first acid is hydrochloric acid.

The first liquid material and second liquid material can be mixed in any suitable manner, including, but not limited to, stirring or blending, sufficient to effect a thorough mixing so as to form a gel comprising silica ($SiO_2$) and the at least one perfluoroalkylsulfonic acid salt.

The gel can then be contacted with a second acidic solution comprising a second acid to thereby form an acid-treated gel and to thereby convert at least a portion of the at least one perfluoroalkylsulfonic acid salt to at least one perfluoroalkylsulfonic acid of the formula $C_nF_{2n+1}SO_3H$.

Any suitable acid effective in converting at least a portion of the at least one perfluoroalkylsulfonic acid salt to at least one perfluoroalkylsulfonic acid can be used as the second acid. Preferably, the second acid is sulfuric acid.

More particularly, the contacting of the gel with the second acidic solution results in the at least partial conversion of the at least one perfluoroalkylsulfonic acid salt of the formula $C_nF_{2n+1}SO_3X$ to the at least one perfluoroalkylsulfonic acid of the formula $C_nF_{2n+1}SO_3H$ and the at least partial conversion of the acid to its acid salt. The preferred acid, sulfuric acid ($H_2SO_4$), is at least partially converted to its acid salt ($X_2SO_4$).

The acid-treated gel can then be washed with water in order to at least partially remove the acid salt to thereby form a purified gel.

The purified gel can then be dried at a temperature of between about 140° F. (60° C.) and about 180° F. (82.2° C.) to thereby form the catalyst system. Preferably, the drying is performed under vacuum conditions and for greater than 2 hours.

Optionally, a platinum group metal compound can be incorporated into the catalyst system, by any suitable manner, to provide active sites to aid in catalyst regeneration. As used herein, platinum group metals include, but are not limited to, iron, ruthenium, osmium, cobalt, rhodium, iridium, nickel, palladium and platinum.

According to the second embodiment of the present invention, the catalyst system can alternatively be prepared by the following method.

The at least one perfluoroalkylsulfonic acid salt can be prepared by the method described above in the first embodiment.

The at least one perfluoroalkylsulfonic acid salt can be combined, by mixing, stirring or blending, with a silica gel and water to thereby form a gel comprising silica and the at least one perfluoroalkylsulfonic acid salt.

The gel can then be contacted with an acidic solution comprising an acid to thereby form an acid-treated gel and to thereby convert at least a portion of the at least one perfluoroalkylsulfonic acid salt to at least one perfluoroalkylsulfonic acid of the formula $C_nF_{2n+1}SO_3H$.

Any suitable acid effective in converting at least a portion of the at least one perfluoroalkylsulfonic acid salt to at least one perfluoroalkylsulfonic acid can be used as the acid. Preferably, the acid is sulfuric acid.

More particularly, the contacting of the gel with the acidic solution results in the at least partial conversion of the at least one perfluoroalkylsulfonic acid salt of the formula $C_nF_{2n+1}SO_3X$ to the at least one perfluoroalkylsulfonic acid of the formula $C_nF_{2n+1}SO_3H$ and the at least partial conversion of the acid to its acid salt. The preferred acid, sulfuric acid ($H_2SO_4$), is at least partially converted to its acid salt ($X_2SO_4$).

The acid-treated gel can then be washed with water in order to at least partially remove the acid salt to thereby form a purified gel.

The purified gel can then be dried at a temperature of between about 140° F. (60° C.) and about 180° F. (82.2° C.) to thereby form the catalyst system. Preferably, the drying is performed under vacuum conditions and for greater than 2 hours.

Optionally, a platinum group metal compound can be incorporated into the catalyst system, by any suitable manner, to provide active sites to aid in catalyst regeneration.

According to the third embodiment of the present invention, a process useful for oligomerizing at least a portion of a hydrocarbon feedstock comprises, consists essentially of, or consists of contacting the hydrocarbon feedstock with a catalyst system under conditions sufficient to effect the oligomerization of at least a portion of the hydrocarbon feedstock. The catalyst system can be produced by the method of the first embodiment or, alternatively, by the method of the second embodiment.

The term "hydrocarbon feedstock" is generally referred to, unless otherwise indicated, as one or more hydrocarbons or substituted hydrocarbons having in the range of from about 2 carbon atoms to about 30 carbon atoms, preferably about 3 to about 20, and most preferably 3 to 16 carbon atoms per molecule. Non-limiting examples of suitable hydrocarbon feedstocks include gasolines from catalytic oil cracking (e.g., FCC and hydrocracking) processes, pyrolysis gasolines from thermal hydrocarbon (e.g., ethane, propane, and naphtha) cracking processes, coker naphtha, light coker naphtha, straight run naphtha, light naphtha and the like. The most preferred hydrocarbon feedstock comprises at least one olefin containing in the range of from 3 to 10 carbon atoms per molecule.

Generally, the hydrocarbon feedstock is contacted with the inventive catalyst system contained in an oligomerization zone. The hydrocarbon feedstock can be contacted with the inventive catalyst system by any suitable manner. The contacting step can be operated as a batch process step or, preferably, as a continuous process step. In the latter operation, a solid catalyst bed or a moving catalyst bed or a fluidized catalyst bed can be employed. Any of these operational modes has advantages and disadvantages, and those skilled in the art can select the one most suitable for a particular feed and catalyst system.

The contacting step is preferably carried out within an oligomerization zone, wherein is contained the inventive catalyst system, and under reaction conditions that suitably promote oligomerization of at least a portion of the unsaturated hydrocarbons of the hydrocarbon feedstock. The reaction temperature of the oligomerization zone is more particularly in the range of from about 150° F. (65.6° C.) to about 300° F. (148.9° C.), preferably in the range of from about 190° F. (87.8° C.) to about 260° F. (126.7° C.), and most preferably in the range of from 200° F. (93.3° C.) to 240° F. (115.6° C.). The oligomerization zone is operated at a pressure sufficient to maintain the reactants in liquid form. The contacting pressure of the oligomerization zone is generally within the range of from about 0 psig to about 1000 psig, preferably in the range of from about 50 psig to about 500 psig, and most preferably from 100 psig to 250 psig.

The flow rate at which the hydrocarbon feedstock is charged to the oligomerization zone is such as to provide a weight hourly space velocity ("WHSV") in the range of from exceeding 0 hour$^{-1}$ upwardly to about 1000 hour$^{-1}$. The term "weight hourly space velocity", as used herein, shall mean the numerical ratio of the rate at which a hydrocarbon feedstock is charged to the oligomerization zone in pounds per hour divided by the pounds of catalyst contained in the oligomerization zone to which the hydrocarbon feedstock is charged. The preferred WHSV of the hydrocarbon feedstock to the oligomerization zone is preferably in the range of from about 0.25 hour$^{-1}$ to about 250 hour$^{-1}$ and, most preferably, in the range of from 0.5 hour$^{-1}$ to 100 hour$^{-1}$.

The following examples are presented to further illustrate the invention and are not to be construed as unduly limiting its scope.

EXAMPLE I

This example illustrates the preparation of catalysts which were subsequently tested as catalysts in the oligomerization of a hydrocarbon feed comprising olefins.

Catalyst A

A 302.4 gram quantity of tetraethoxysilane was hydrolyzed in 83.6 grams of distilled water containing 2 grams of concentrated HCl solution to form a first liquid material. A clear homogenous solution was obtained in approximately 10 minutes. A second liquid material consisting of 25.0 grams of perfluorooctanesulfonic acid salt ($C_8F_{17}SO_3$—$K^+$) was dissolved in 180 mL of 0.333 N NaOH solution. The first and second liquid materials were combined and gelation occurred within 20 seconds. Excess water was decanted and the gel was dried under vacuum at 50° C. for 16 hours.

After drying, 30.5 grams of the dried solid was washed with 100 mL of 3.5 N HCl solution followed by a 100 mL distilled water wash. A second wash with 100 mL of 3.5 N HCl solution was performed, this solution also contained 2.16 g of a 10% $PtCl_4$ solution in water. The solid was filtered and washed with 50 mL of distilled water.

The filtered solid was placed into a 500 mL flask and 100 mL of 70% $H_2SO_4$ solution was prepared and added at a temperature above 70° C. to the solid. The acidified mixture was stirred for 12 hours. Stirring was stopped and 400 mL of distilled water was added and the solid was filtered off. The solid was then dried at 50° C. for 8 hours. The final catalyst contained 21.0 weight % perfluorooctanesulfonic acid based on the total weight of the catalyst.

Catalyst B

A 91.8 gram quantity of silica (Davison G57 grade) was suspended in 500 mL of distilled water. A 31.7 gram quantity of perfluorooctanesulfonic acid salt ($C_8F_{17}SO_3$—$K^+$) was dissolved in 100 mL of distilled water and added to the silica/water suspension. The mixture was mechanically stirred for 1 hour, then acidified by addition of 40 mL of 98% $H_2SO_4$. Stirring continued for 1 hour and then the solids were settled. The water was decanted and the remaining solids were washed with 100 mL of distilled water and filtered. After filtration, the solid was dried for 24 hours under vacuum. The final catalyst contained 24.4 weight % perfluorooctanesulfonic acid based on the total weight of the catalyst.

EXAMPLE II

This example illustrates the use of the catalysts described in Example I as catalysts in the oligomerization of a hydrocarbon feed comprising olefins.

In Run 1, 20.89 grams of Catalyst A from Example I was placed in an autoclave reactor including a stirring shaft and impeller. Air present in the autoclave reactor was evacuated and the autoclave reactor was heated to 87.8° C. for 1 hour. The reactor was then cooled to 74° C. and $N_2$ was added to a pressure of 50 psig. The autoclave reactor was heated to 94.3° C. and the hydrocarbon feed was introduced to the autoclave reactor over a time period of 3.35 minutes with a stirring rate of 1000 rpm. The autoclave reactor temperature, after 30.0 minutes of contact time, increased to 114.8° C. The product was collected for analysis after 30.0 minutes of contact time and analysis was by means of a gas chromatograph. Test results are summarized in Table 1.

In Run 2, 19.78 grams of Catalyst B from Example I was placed in an autoclave reactor including a stirring shaft and impeller. Air present in the autoclave reactor was evacuated and the autoclave reactor was heated to 87.8° C. for 1 hour. The reactor was then cooled to 74° C. and $N_2$ was added to a pressure of 50 psig. At this time, the hydrocarbon feed was introduced to the autoclave reactor over a time period of 5.50 minutes with a stirring rate of 500 rpm. The autoclave reactor temperature, after 30.0 minutes of contact time, increased to 87.7° C. The product was collected for analysis after 30.0 minutes of contact time and analysis was by means of a gas chromatograph. Test results are summarized in Table 1.

In Run 3, the 19.78 grams of Catalyst B from Run 2 remained in the autoclave reactor which includes a stirring shaft and impeller. Air present in the autoclave reactor was evacuated and the autoclave reactor was heated under vacuum to 87.8° C. for 1 hour. The reactor was then cooled to 74° C. and $N_2$ was added to a pressure of 50 psig. At this time, the hydrocarbon feed was introduced to the autoclave reactor over a time period of 3.35 minutes with a stirring rate of 1000 rpm. The autoclave reactor temperature, after 30.0 minutes of contact time, increased to 115° C. The product was collected for analysis after 30.0 minutes of contact time and analysis was by means of a gas chromatograph. Test results are summarized in Table 2.

In Run 4, the 19.78 grams of Catalyst B from Run 3 remained in the autoclave reactor which includes a stirring shaft and impeller. $N_2$ was added to a pressure of 50 psig. The autoclave reactor was heated to 95° C. and the hydrocarbon feed was introduced to the autoclave reactor over a time period of 3.35 minutes with a stirring rate of 1000 rpm. The autoclave reactor temperature, after 30.0 minutes of contact time, increased to 115° C. The product was collected for analysis after 30.0 minutes of contact time and analysis was by means of a gas chromatograph. Test results are summarized in Table 2.

TABLE 1

|  | Run 1 Catalyst A | Run 2 Catalyst B |
| --- | --- | --- |
| Grams of Catalyst | 20.89 | 19.78 |
| Grams of Feed | 53.9 | 99.6 |
| Temp. ° C. | 114.8 | 87.7 |
| Contact Time (min) | 30.0 | 30.0 |
| Feed Composition (wt %) |  |  |
| <$C_4$ | — | 0.26 |
| n-butane | — | 2.42 |
| iso-butane | — | 92.45 |
| 2-butene | — | 4.86 |
| n-pentane | 0.17 | — |
| iso-pentane | 50.79 | 0.01 |
| 1-pentene | 23.98 | — |
| 2-methylbutene-1 | 2.34 | — |
| 2-methylbutene-2 | 22.51 | — |
| 2-pentene (trans) | 0.04 | — |
| 2-pentene (cis) | 0.03 | — |
| 2,3-dimethyl-2-butene | — | — |
| Unknown $C_6$+ | 0.14 | — |
| Product Composition (wt %) |  |  |
| <$C_4$ | 1.57 | 0.24 |
| n-butane | — | 2.57 |
| iso-butane | — | 93.49 |
| 2-butene | — | 3.16 |
| n-pentane | 0.14 | — |
| iso-pentane | 57.00 | 0.02 |
| Total pentenes | 24.81 | — |
| Total hexenes | — | — |
| $C_6$+ | 16.48 | 0.55 |
| butene conversion (weight %) | — | 35.0 |
| pentene conversion (weight %) | 50.7 | — |
| hexene conversion (weight %) | — | — |
| $C_9$+ selectivity | 80.6 | 51.5 |

$C_9$+ selectivity = % of $C_6$+ material with 9 or more carbon atoms per molecule.

TABLE 2

|  | Run 3 Catalyst B | Run 4 Catalyst B |
| --- | --- | --- |
| Grams of Catalyst | 19.78 | 19.78 |
| Grams of Feed | 53.03 | 45.39 |
| Temp. ° C. | 115 | 115 |
| Contact Time (min) | 30.0 | 30.0 |
| Feed Composition (wt %) |  |  |
| propane | — | — |
| n-butane | 0.01 | — |
| iso-butane | 0.04 | 0.01 |
| 2-butene | — | — |
| n-pentane | — | 0.10 |
| iso-pentane | 59.15 | 51.03 |
| 1-pentene | 20.20 | 15.19 |
| 2-methylbutene-1 | 1.64 | 1.93 |
| 2-methylbutene-2 | 18.60 | 20.33 |
| 2-pentene (trans) | 0.03 | 0.02 |
| 2-pentene (cis) | 0.02 | 0.02 |
| 2,3-dimethyl-2-butene | — | 11.09 |
| Unknown $C_6$+ | 0.30 | 0.27 |
| Product Composition (wt %) |  |  |
| <$C_4$ | — | — |
| n-butane | 0.13 | 0.09 |
| iso-butane | 4.14 | 0.08 |
| 2-butene | 0.16 | 0.01 |
| n-pentane | 0.12 | 0.08 |
| iso-pentane | 58.84 | 51.13 |
| Total pentenes | 16.10 | 14.47 |
| Total hexenes | — | 4.66 |
| $C_6$+ | 20.51 | 29.48 |
| butene conversion (weight %) | — | — |
| pentene conversion (weight %) | 60.2 | 61.4 |
| hexene conversion (weight %) | — | 58.0 |
| $C_9$+ Selectivity | 91.3 | 92.8 |

$C_9$+ selectivity = % of $C_6$+ material with 9 or more carbon atoms per molecule.

The test data presented in Tables 1 and 2 show that inventive Catalyst A used in Run 1 and inventive Catalyst B used in Runs 2, 3 and 4 were active in oligomerizing olefins to diesel range material with olefin conversions ranging from 35.1 weight % to 61.4 weight %.

Reasonable variations, modifications, and adaptations can be made within the scope of the disclosure and the appended claims without departing from the scope of this invention.

That which is claimed is:

1. A process for oligomerizing at least a portion of a hydrocarbon feedstock comprising at least one olefin having in the range of from 3 to 10 carbon atoms per molecule, said process comprising contacting said hydrocarbon feedstock, at a temperature in the range of from about 150° F. to about 300° F., with a catalyst system prepared by dissolving at least a portion of at least one perfluoroalkylsulfonic acid salt of the formula $C_nF_{2n+1}SO_3X$ in a basic solution comprising a base to thereby form a first liquid material, wherein n ranges from 2 to 20 and X is an element selected from the group consisting of sodium and potassium;

dissolving at least a portion of at least one hydrolyzable silane compound in a first acidic solution comprising a first acid to thereby form a second liquid material comprising at least one silanol comprising hydroxy groups and silicon;

mixing said first liquid material and said second liquid material to thereby form a gel comprising silica and said at least one perfluoroalkylsulfonic acid salt;

containing said gel with a second acidic solution comprising a second acid to thereby form an acid-treated gel and to thereby convert at least a portion of said at least one perfluroalkylsulfonic acid salt to at least one perfluoroalkylsulfonic acid of the formula $C_nF_{2n+1}SO_3H$ and to thereby convert at least a portion of said second acid to an acid salt;

removing at least a portion of said acid salt from said acid-treated gel to thereby form a purified gel; and drying said purified gel to thereby form said catalyst system.

2. A process in accordance with claim 1 wherein said perfluoroalkylsulfonic acid salt is prepared by contacting perfluoroalkylsulfonic acid with a compound of the formula XOH to thereby form said perfluoroalkylsulfonic acid salt.

3. A process in accordance with claim 1 wherein said perfluoroalkylsulfonic acid salt is prepared by contacting perfluoroalkylsulfonyl halide of the formula $C_nF_{2n+1}SO_2Y$ with a compound of the formula XOH to thereby form said perfluoroalkylsulfonic acid salt, wherein Y is a halide.

4. A process in accordance with claim 1 wherein said first acid is hydrochloric acid.

5. A process in accordance with claim 1 wherein said second acid is sulfuric acid.

6. A process in accordance with claim 1 wherein n is 8.

7. A process in accordance with claim 1 wherein said at least one hydrolyzable silane compound is an alkoxysilane.

8. A process in accordance with claim 7 wherein said alkoxysilane is selected from the group consisting of tetramethoxysilane and tetraethoxysilane.

9. A process for oligomerizing at least a portion of a hydrocarbon feedstock comprising at least one olefin having in the range of from 3 to 10 carbon atoms per molecule, said process comprising contacting said hydrocarbon feedstock, at a temperature in the range from about 150° F. to about 300° F., with a catalyst system prepared by:

preparing a perfluoroalkylsulfonic acid salt of the formula $C_7F_{17}SO_3X$ by contacting perfluoroalkylsulfonic acid of the formula $C_8F_{17}SO_3H$ with a compound of the formula XOH to thereby form said perfluoroalkylsulfonic acid salt; wherein X is an element selected from the group consisting of sodium and potassium;

dissolving at least a portion of said perfluoroalkylsulfonic acid salt in a basic solution comprising a base to thereby form a first liquid material;

dissolving at least a portion of at least one alkoxysilane compound selected from the group consisting of tetramethoxysilane and tetraethoxysilane in a first acidic solution comprising a first acid comprising hydrochloric acid to thereby form a second liquid material comprising at least one silanol comprising hydroxy groups and silicon;

mixing said first liquid material and said second liquid material to thereby form a gel comprising silica and said at least one perfluoroalkylsulfonic acid salt;

contacting said gel with a second acidic solution comprising a second acid comprising sulfuric acid to thereby form an acid-treated gel and to thereby convert at least a portion of said at least one perfluoroalkylsulfonic acid salt to at least one perfluoroalkylsulfonic acid of the formula $C_8F_{17}SO_3H$ and to thereby convert at least a portion of said second acid to an acid salt;

removing at least a portion of said acid salt from said acid-treated gel to thereby form a purified gel; and drying said purified gel to thereby form said catalyst system.

10. A process for oligomerizing at least a portion of a hydrocarbon feedstock comprising at least one olefin having in the range of from 3 to 10 carbon atoms per molecule, said process comprising contacting said hydrocarbon feedstock, at a temperature in the range of from about 150° F. to about 300° F., with a catalyst system prepared by:

mixing at least one perfluoroalkylsulfonic acid salt of the formula $C_nF_{2n+1}SO_3X$ with silica gel and water to thereby form a gel comprising silica and said at least one perfluoroalkylsulfonic acid salt, wherein n ranges from 2 to 20 and X is an element selected from the group consisting of sodium and potassium;

contacting said gel with an acid solution comprising an acid to thereby form an acid-treated gel and to thereby convert at least a portion of said at least one perfluoroalkylsulfonic acid salt to at least one perfluoroalkylsulfonic acid of the formula $C_nF_{2n+1}SO_3H$ and to thereby convert at least a portion of said acid to an acid salt;

removing at least a portion of said acid salt from said acid-treated gel to form a purified gel; and drying said purified gel to thereby form said catalyst system.

11. A process in accordance with claim 10 wherein said perfluoroalkylsulfonic acid salt is prepared by contacting perfluoroalkylsulfonic acid with a compound of the formula XOH to thereby form said perfluoroalkylsulfonic acid salt.

12. A process in accordance with claim 10 wherein said perfluoroalkylsulfonic acid salt is prepared by contacting perfluoroalkylsulfonyl halide of the formula $C_nF_{2n+1}SO_2Y$ with a compound of the formula XOH to thereby form said perfluoroalkylsulfonic acid salt, wherein Y is a halide.

13. A process in accordance with claim 10 wherein said acid is sulfuric acid.

14. A process in accordance with claim 10 wherein n is 8.

15. A process for oligomerizing at least a portion of a hydrocarbon feedstock comprising at least one olefin having in the range of from 3 to 10 carbon atoms per molecule, said process comprising contacting with hydrocarbon feedstock, at a temperature in the range of from about 150° F. to about 300° F., with a catalyst system prepared by:

preparing a perfluoroalkylsulfonic acid salt of the formula $C_8F_{17}SO_3X$ by contacting perfluoroalkylsulfonic acid of the formula $C_8F_{17}SO_3H$ with a compound of the formula XOH to thereby form said perfluroalkylsulfonic acid salt; wherein X is an element selected from the group consisting of sodium and potassium;

mixing said perfluoroalkylsulfonic acid salt with silica gel and water to thereby form a gel comprising silica and said at least one perfluoroalkylsulfonic acid salt;

contacting said gel with an acidic solution comprising an acid comprising sulfuric acid to thereby form an acid-treated gel and to thereby convert at least a portion of said at least one perfluoroalkylsulfonic acid salt to at least one perfluoroalkylsulfonic acid of the formula $C_8F_{17}SO_3H$ and to thereby convert at least a portion of said acid to an acid salt;

removing at least a portion of said acid salt from said acid-treated gel to form a purified gel; and drying said purified gel to thereby form said catalyst system.

* * * * *

UNITED STATES PATENT AND TRADEMARK OFFICE
CERTIFICATE OF CORRECTION

PATENT NO.    : 6,384,291 B2
DATED         : May 7, 2002
INVENTOR(S)   : G. J. Greenwood and Bruce B. Randolph It is certified that error appears in the above-identified patent and that said Letters Patent is hereby corrected as shown below:

Column 9,
Line 25, please delete "$C_7F_{17},SO_3X$" and insert therefor -- $C_8F_{17}SO_3X$ --.

Signed and Sealed this

Twenty-first Day of January, 2003

JAMES E. ROGAN
*Director of the United States Patent and Trademark Office*